United States Patent
Hara (10) Patent No.: US 11,875,582 B2
(45) Date of Patent: Jan. 16, 2024

(54) VEHICLE NUMBER IDENTIFICATION DEVICE, VEHICLE NUMBER IDENTIFICATION METHOD, AND PROGRAM

(71) Applicant: MITSUBISHI HEAVY INDUSTRIES MACHINERY SYSTEMS, LTD., Hyogo (JP)

(72) Inventor: Kenta Hara, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 533 days.

(21) Appl. No.: 17/256,375

(22) PCT Filed: Jul. 4, 2018

(86) PCT No.: PCT/JP2018/025343
§ 371 (c)(1),
(2) Date: Dec. 28, 2020

(87) PCT Pub. No.: WO2020/008556
PCT Pub. Date: Jan. 9, 2020

(65) Prior Publication Data
US 2021/0271897 A1 Sep. 2, 2021

(51) Int. Cl.
*G06N 20/00* (2019.01)
*G06Q 20/40* (2012.01)
(Continued)

(52) U.S. Cl.
CPC ............. *G06V 20/62* (2022.01); *G06N 20/00* (2019.01); *G06Q 20/4016* (2013.01);
(Continued)

(58) Field of Classification Search
CPC .. G06V 20/62; G06V 20/54; G06V 30/19167; G06V 30/10; G06V 20/625; G06N 20/00; G06Q 20/4016
See application file for complete search history.

(56) References Cited

U.S. PATENT DOCUMENTS

| | | | |
|---|---|---|---|
| 10,929,661 B1 * | 2/2021 | Manyam | G06V 40/172 |
| 2011/0194733 A1 * | 8/2011 | Wilson | G06V 10/987 |
| | | | 382/105 |

(Continued)

FOREIGN PATENT DOCUMENTS

| | | |
|---|---|---|
| JP | 2008-059326 A | 3/2008 |
| JP | 2017-130174 A | 7/2017 |

(Continued)

OTHER PUBLICATIONS

PCT/ISA/210, "International Search Report for International Application No. PCT/JP2018/025343," dated Oct. 9, 2018.

(Continued)

*Primary Examiner* — Pinalben Patel
(74) *Attorney, Agent, or Firm* — Manabu Kanesaka; Benjamin Hauptman; Kenneth Berner (57) ABSTRACT

A vehicle number identification device includes a registration-number-information acquisition part configured to acquire registration number information associated with an identification media installed in a vehicle; a number-plate-image acquisition part configured to acquire a number-plate image of the vehicle; an OCR processing part configured to acquire OCR resultant information representing a result of an optical character recognition with respect to the number-plate image; an estimation processing part configured to input the number-plate image into a machine-learning model and to acquire estimation result information output from the machine-learning model; and a matching determination part configured to determine whether at least two types of (Continued)

information out of the registration number information, the OCR resultant information, and the estimation result information indicate a same vehicle number and to identify the same vehicle number as a vehicle number of the vehicle.

4 Claims, 6 Drawing Sheets

(51) Int. Cl.
    *G06V 20/54*     (2022.01)
    *G06V 30/19*     (2022.01)
    *G06V 30/10*     (2022.01)
    *G06V 20/62*     (2022.01)

(52) U.S. Cl.
    CPC ........ *G06V 20/54* (2022.01); *G06V 30/19167* (2022.01); *G06V 20/625* (2022.01); *G06V 30/10* (2022.01)

(56) References Cited

U.S. PATENT DOCUMENTS

| | | | |
|---|---|---|---|
| 2014/0074567 A1* | 3/2014 | Hedley | G06V 20/62 |
| | | | 705/13 |
| 2016/0049015 A1* | 2/2016 | Hedley | H04N 7/188 |
| | | | 705/13 |
| 2017/0147991 A1* | 5/2017 | Franke | G01M 17/00 |
| 2019/0066492 A1* | 2/2019 | Nijhuis | G06V 20/52 |

FOREIGN PATENT DOCUMENTS

| | | | |
|---|---|---|---|
| JP | 2017130174 A | * | 7/2017 |
| KR | 10-1803697 B1 | | 12/2017 |

OTHER PUBLICATIONS

PCT/ISA/237, "Written Opinion of the International Searching Authority for International Application No. PCT/JP2018/025343," dated Oct. 9, 2018.

* cited by examiner

VEHICLE NUMBER IDENTIFICATION DEVICE, VEHICLE NUMBER IDENTIFICATION METHOD, AND PROGRAM

RELATED APPLICATIONS

The present application is a National Phase of International Application Number PCT/JP2018/025343 filed Jul. 4, 2018.

TECHNICAL FIELD

The present invention relates to a vehicle number identification device, a vehicle number identification method, and a program.

BACKGROUND ART

As one method for identifying vehicles, it is possible to mention a method for reading the number plates of vehicles. For example, Patent Document 1 discloses a parking-area management system configured to carry out both the OCR process for reading characters and the pattern-matching process using image-compressed data stored on memory with respect to images of number plates of vehicles.

CITATION LIST

Patent Literature Document

Patent Document 1: Japanese Patent Application Publication No. 2008-59326

SUMMARY OF INVENTION

Technical Problem

As methods for identifying vehicles other than methods for reading the number plates of vehicles, it is possible to mention a method for acquiring identification information from in-vehicle devices or tags installed in vehicles. For example, a billing system of toll roads may identify a vehicle upon acquiring its identification information from an in-vehicle device or a tag installed in a vehicle running on toll roads so as to charge tolls for the identified vehicle.

By combining a method for acquiring identification information from an in-vehicle device or a tag installed in a vehicle and another method, it is possible for a vehicle identification device to improve or complement the result produced by the method for acquiring identification information from an in-vehicle device or a tag installed in a vehicle. Even when a billing system of toll roads fails to identify a vehicle according to the method for receiving identification information from an in-vehicle device or a tag installed in a vehicle, for example, it is possible to identify the vehicle according to another method, thus charging tolls for the identified vehicle.

When a vehicle identification device may combine the method for acquiring identification information from an in-vehicle device or a tag installed in a vehicle and another method, it is preferable that the vehicle identification device involve a relatively small burden of human resources required for operating the vehicle identification device. For example, it is preferable that the vehicle identification device involve a relatively small burden of human resources required for preparing data necessary to identify vehicles.

The present invention aims to provide a vehicle number identification device, a vehicle number identification method, and a program involving a relatively small burden of human resources required for operating a vehicle identification device which may combine a method for acquiring identification information from an in-vehicle device or a tag installed in a vehicle and another method.

Solution to Problem

In a first aspect of the present invention, a vehicle number identification device (200) includes a registration-number-information acquisition part (281) configured to acquire registration number information associated with an identification media (910) installed in a vehicle (900); a number-plate-image acquisition part (282) configured to acquire a number-plate image of the vehicle; an OCR processing part (283) configured to acquire OCR resultant information representing a result of an optical character recognition with respect to the number-plate image; an estimation processing part (284) configured to input the number-plate image into a machine-learning model and to acquire estimation result information output from the machine-learning model; and a matching determination part (285) configured to determine whether at least two types of information out of the registration number information, the OCR resultant information, and the estimation result information indicate a same vehicle number and to identify the same vehicle number as a vehicle number of the vehicle.

According to the above configuration, the vehicle number identification device is configured to apply the data used for identifying vehicles to machine learning. According to the vehicle number identification device, it is possible to improve the accuracy of identifying vehicles via machine learning without the necessity of preparing special data for machine learning. In this point, it is possible for the vehicle number identification device to reduce a burden of human resources for its device operation, thus achieving a relatively small burden of human resources.

The vehicle number identification device may further include a machine-learning-data generation part (286) configured to generate machine-learning data representing an association between the vehicle number and the number-plate image when the matching determination part determines that at least two types of information out of the registration number information, the OCR resultant information, and the estimation result information indicate the same vehicle number.

According to the above configuration, the vehicle number identification device is configured to automatically generate the machine-learning data.

The vehicle number identification device may further include an image presentation part (220) configured to present the number-plate image when the matching determination part determines that any combination including at least two types of information out of the registration number information, the OCR resultant information, and the estimation result information does not indicate the same vehicle number, wherein the machine-learning-data generation part may generate the machine-learning data representing an association between the vehicle number input thereto and the number-plate image.

According to the above configuration, it is possible for an operator to input the vehicle number with respect to the number-plate image only when the matching determination part determines that any combination including two types of information out of the registration number information, the OCR resultant information, and the estimation result information does not indicate the same vehicle number. Normally, it is expected that the registration number information and the OCR resultant information indicate the same vehicle number, and therefore it is possible to reduce a frequency in which an operator needs to input the vehicle number with reference to the number-plate image.

The vehicle number identification device may further includes a fraud determination part (288) configured to determine a possibility of a fraudulent vehicle to be regarded as the vehicle indicated by the vehicle number when the matching determination part determines an incapacity of obtaining the registration number information representing the same vehicle number indicated by the OCR resultant information and the estimation result information.

According to the above configuration, the vehicle number identification device is configured not only to identify the vehicle but also to determine a possibility of committing a fraud.

In a second aspect of the present invention, a vehicle number identification method includes the steps of: acquiring registration number information associated with an identification media installed in a vehicle; acquiring a number-plate image of the vehicle; acquiring OCR resultant information representing a result of an optical character recognition with respect to the number-plate image; inputting the number-plate image into a machine-learning model and thereby acquiring estimation result information output from the machine-learning model; and upon determining whether at least two types of information out of the registration number information, the OCR resultant information, and the estimation result information indicate a same vehicle number, identifying the same vehicle number as a vehicle number of the vehicle.

According to the vehicle number identification method, it is possible to apply the data used for identifying vehicles to machine learning. According to the vehicle number identification method, it is possible to improve the accuracy of identifying vehicles via machine learning without the necessity of preparing special data for machine learning. In this point, it is possible for the vehicle number identification method to reduce a burden of human resources for its device operation, thus achieving a relatively small burden of human resources.

In a third aspect of the present invention, a program causes a computer to implement the steps of: acquiring registration number information associated with an identification media installed in a vehicle; acquiring a number-plate image of the vehicle; acquiring OCR resultant information representing a result of an optical character recognition with respect to the number-plate image; inputting the number-plate image into a machine-learning model and thereby acquiring estimation result information output from the machine-learning model; and upon determining whether at least two types of information out of the registration number information, the OCR resultant information, and the estimation result information indicate a same vehicle number, identifying the same vehicle number as a vehicle number of the vehicle.

According to the program, it is possible to apply the data used for identifying vehicle to machine learning. According to the vehicle number identification method, it is possible to improve an accuracy of identifying vehicles via machine learning without the necessity of preparing special data for machine learning. In this point, it is possible for the vehicle number identification method to reduce a burden of human resources for its device operation, thus achieving a relatively small burden of human resources.

Advantageous Effects of Invention

According to the aforementioned vehicle number identification device, the vehicle number identification method, and the program, a vehicle identification device may involve a relatively small burden of human resources required for operating the vehicle identification device upon combining the method for acquiring identification information from an in-vehicle device or a tag installed in a vehicle and another method.

DESCRIPTION OF EXEMPLARY EMBODIMENTS

Hereinafter, the exemplary embodiment of the present invention will be described below, but the exemplary embodiment does not necessarily limit the scope of the invention as defined in the appended claims. In addition, all combinations of features described in the exemplary embodiment are not necessarily essential to the solving means of the present embodiment.

Figure 1:
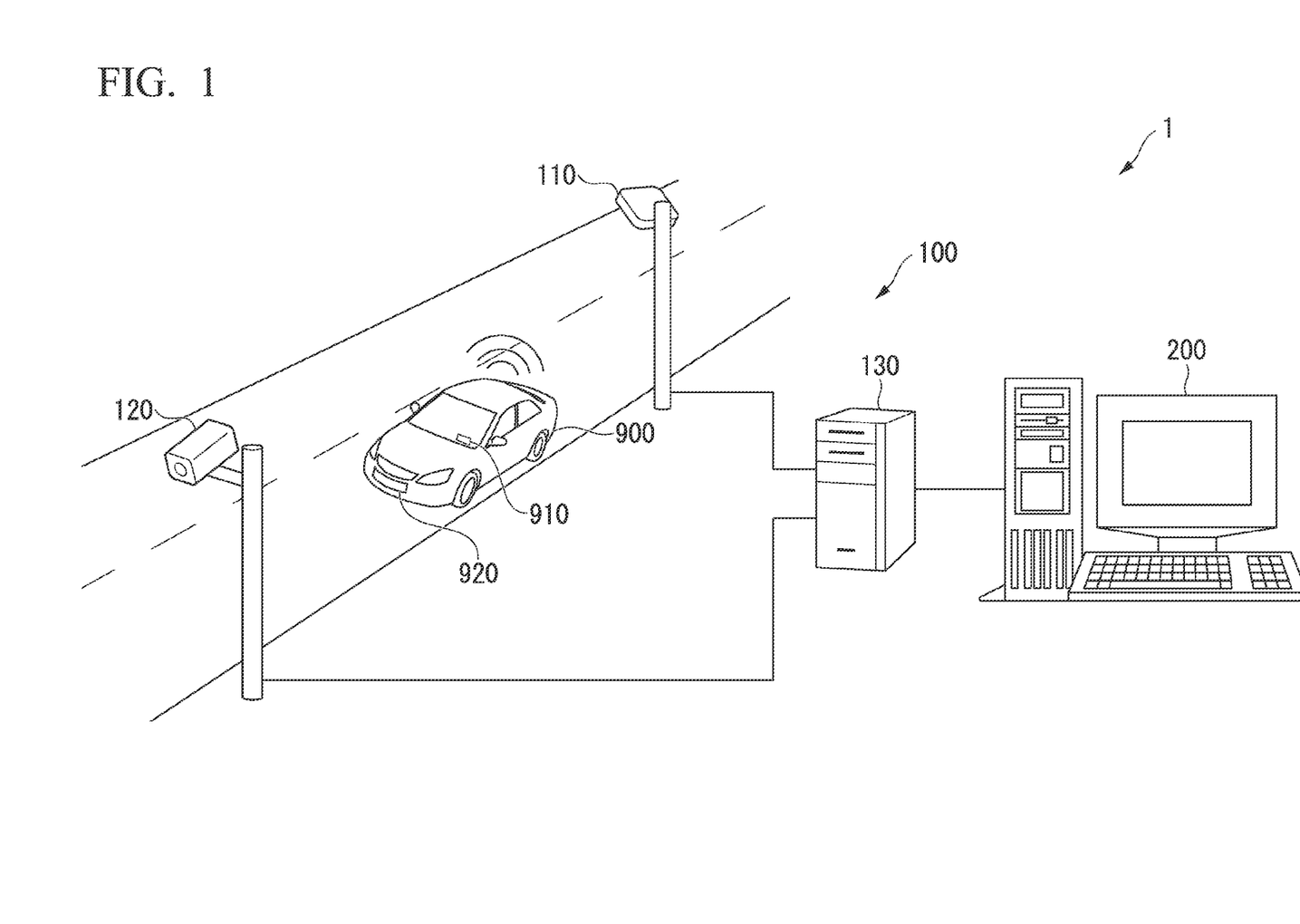
FIG. 1 is a schematic diagram showing an exemplary configuration of a vehicle number identification system according to the exemplary embodiment.
Figure 2:
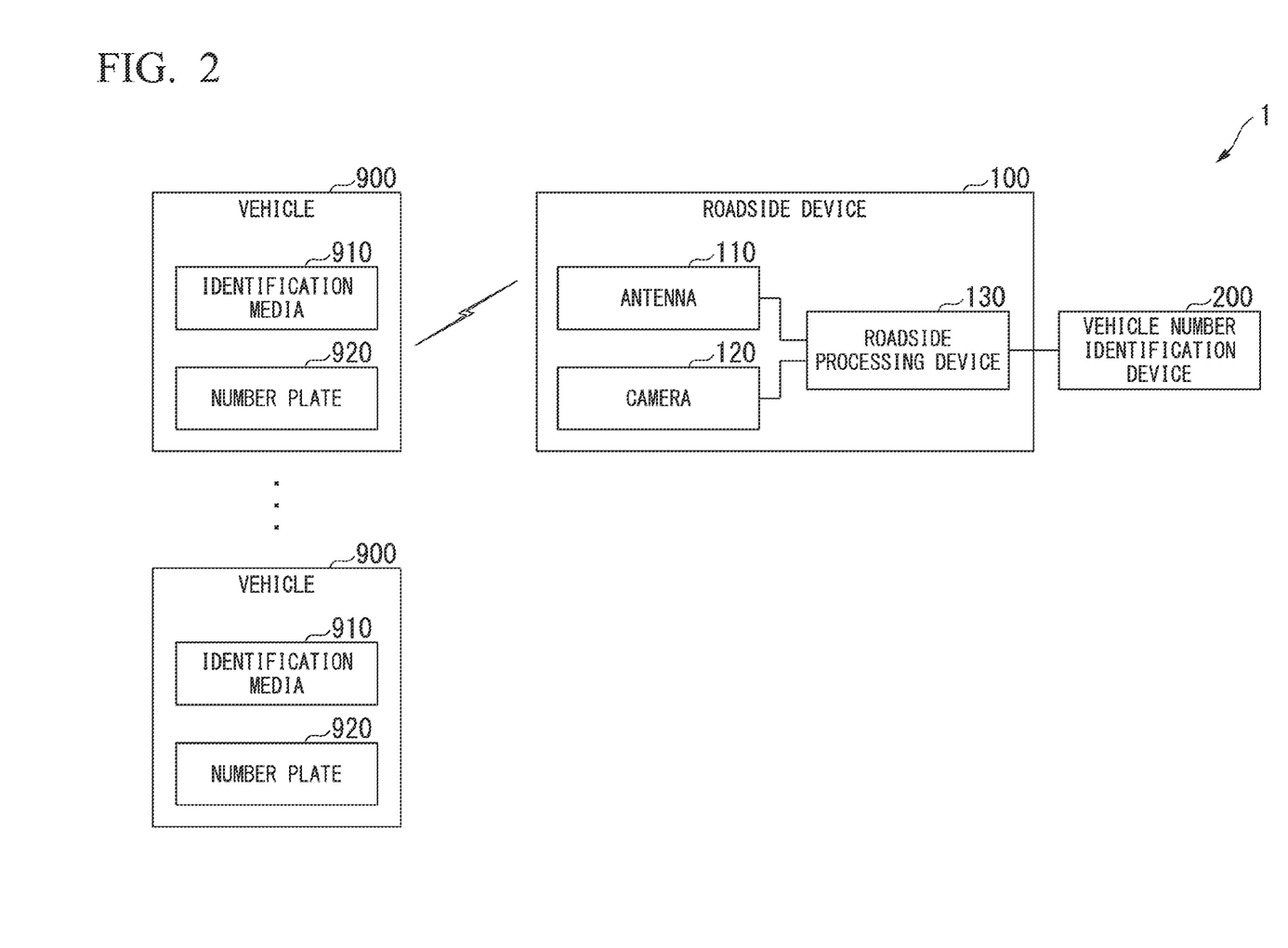
FIG. 2 is a block diagram showing a block configuration of the vehicle number identification system according to the exemplary embodiment.

FIG. 1 is a schematic diagram showing an exemplary device configuration of a vehicle number identification system according to the exemplary embodiment. FIG. 2 is a block diagram showing a block configuration of the vehicle number identification system shown in FIG. 1.

According to the configurations shown in FIGS. 1-2, a vehicle number identification system 1 includes a roadside device 100 and a vehicle number identification device 200. The roadside device 100 includes an antenna 110, a camera 120, and a roadside processing device 130.

The vehicle number identification system 1 is configured to identify a vehicle by determining a vehicle number (e.g. a registration number or a license number). For example, the vehicle discussed here may include any types of vehicles which can run on public roads by themselves such as an automobile or a motorcycle. The vehicle number is identification information which is attached to each vehicle to identify each vehicle. The vehicle number is described on a number plate attached to a vehicle. The number plate can be referred to as a license plate or a vehicle registration plate.

The vehicle number identification system 1 may denote a vehicle whose vehicle number is to be identified as a vehicle 900. The vehicle number identification system 1 may need two or more vehicles 900.

As shown in FIGS. 1-2, an authenticate vehicle 900 is equipped with an identification media 910. In addition, the vehicle 900 is equipped with a number plate 920.

The media identification information for identifying the identification media 910 was recorded on the identification media 910 in advance. The identification media 910 is configured to transmit its media identification information to the vehicle number identification system 1.

The media identification information can be used as the information for identifying the identification media 910 and the information for identifying the vehicle 900 equipped with the identification media 910. The vehicle number identification system 1 is configured to identify the vehicle 900 using the media identification information.

The identification media 910 may be any types of media having recorded the media identification information and capable of transmitting the media identification information to the antenna 110. For example, the identification media 910 may be configured of a tag of RFID (Radio Frequency Identifier). Alternatively, the identification media 910 may be configured of an in-vehicle device such as an in-vehicle device for charging tolls.

The following descriptions refer to an exemplary case in which the vehicle number identification system 1 is used for a billing system for charging fees of toll roads such as highways. The vehicle number identification system 1 is configured to detect the vehicle 900 running in a predetermined charging area located in toll roads, to identify the vehicle number of the detected vehicle 900, and to thereby identify the vehicle 900. Since the vehicle number identification system 1 is configured to identify the vehicle 900, the billing system may automatically charge tolls for the identified vehicle 900 to run toll roads.

In this connection, the applied field of the vehicle number identification system 1 is not necessarily limited to the billing system of toll roads. The vehicle number identification system 1 can be used in various fields requiring identifying the vehicle 900. When the vehicle number identification system 1 is used as a billing system of a parking area, for example, the vehicle number identification system 1 may identify the vehicle 900 entering into the parking area. Since the vehicle number identification system 1 is configured to identify the vehicle 900, a billing system may automatically charge parking fees for the identified vehicle 900.

Alternatively, it is possible to use the vehicle number identification system 1 for the purpose of monitoring or managing vehicles in an area solely allocated to its available vehicles. For example, it is possible to use the vehicle number identification system 1 for the purpose of managing construction vehicles entering into construction sites, monitoring vehicles entering into taxi stations, or monitoring vehicles parked in an parking area of a condominium.

The roadside device 100 is configured to acquire the information for identifying the vehicle 900. The vehicle number identification system 1 may need one or more roadside devices 100. When the vehicle number identification system 1 is equipped with a plurality of roadside devices 100, the vehicle number identification device 200 can be commonly applied to a plurality of roadside devices 100. The vehicle number identification device 200 is configured to identify the vehicle number of the vehicle 900 upon acquiring the information relating to the vehicle 900 from each of the roadside devices 100.

The antenna 110 is installed in a charging area of a toll road and configured to receive the media identification information from the identification media 910 of the vehicle 900 passing through the charging area. The identification media 910 may continuously or periodically transmit the media identification information so that the antenna 110 can receive the media identification information. Alternatively, the antenna 110 may transmit to the identification media 910 a request signal for requesting the media identification information. Responsive to the request signal, the identification media 910 may transmit the media identification information to the antenna 110 so that the antenna 100 can receive the media identification information.

The camera 120 is configured to capture an image of the number plate 920 of the vehicle 900. For example, the camera 120 is configured to capture an image covering the entire front face of the vehicle 900 including the number plate 920. Subsequently, the roadside processing device 130 is configured to extract an image of the number plate 920 from an image of the entire front face of the vehicle 900.

The camera 120 may continuously or periodically capture images and transmit images to the roadside processing device 130, which in turn may extract images reflecting the vehicle 900 from images captured by the camera 120. Alternatively, the roadside device 100 may be further equipped with a vehicle detector fixed at an image-capture position of the camera 120. In addition, the camera 120 may capture images at the timing of a vehicle detector to detect a vehicle.

The roadside processing device 130 is configured to acquire the media identification information from the antenna 110 and to acquire the vehicle number associated with the media identification information.

For example, an owner of the vehicle 900 configured to run toll roads is under obligation to attach the identification media 910 to the vehicle 900 and to register usage of the identification media 910 in advance. Due to the advance registration for registering the media identification information and the vehicle number, the roadside processing device 130 has stored the usage registration information representing an association between the media identification information and the vehicle number in advance. Upon acquiring the media identification information from the antenna 110, the roadside processing device 130 may search the usage registration information using the media identification information as a search key so as to acquire the vehicle number associated with the media identification information. The information representing the vehicle number acquired by the roadside processing device 130 will be referred to as the registration number information.

Occasionally, the roadside processing device 130 may fail to acquire the media identification information. When the identification media 910 is fraudulently removed from the vehicle 900 in evasion of charging, for example, the roadside processing device 130 cannot acquire the media identification information. Despite the installation of the identification media 910 in the vehicle 900, the roadside processing device 130 cannot acquire the media identification information when the antenna 110 failed to communicate with the identification media 910 by chance.

Due to a failure of acquiring the media identification information, for example, the roadside processing device 130 may set the registration number information to a predetermined value indicating a failure of acquiring the media identification information such as a null character string.

In addition, the roadside processing device 130 is configured to acquire an image of the number plate 920 of the vehicle 900. As described above, for example, the camera 120 is configured to capture an image of the entire front face of the vehicle 900 including the number plate 920. Subsequently, the roadside processing device 130 is configured to extract an image of the number plate 920 from the image of the entire front face of the vehicle 900.

In this connection, the roadside processing device 130 may fail to acquire an image of the number plate 920. For example, the roadside processing device 130 fails to capture the image of the number plate 920 due to an incapacity of imaging the number plate 920 being hidden by a large vehicle such as a truck running in front of the vehicle 900. Even though the number plate 920 is reflected in the image captured by the camera 120, the roadside processing device 130 cannot obtain an image of the number plate 920 when the roadside processing device 130 fails to extract the image of the number plate 920 but succeeds to extract another image representative of another part of the vehicle 900 other than the number plate 920.

Due to a failure of capturing the image of the number plate 920, the roadside processing device 130 sets the image data of the number plate 920 to a predetermined value representing a failure of acquiring images in such a way that all the pixel values of the image data of the number plate 920 are set to zeros. Alternatively, the roadside processing device 130 may directly transmit some image data to the vehicle number identification device 200 so that the vehicle number identification device 200 can determine whether or not to successfully acquire the image data of the number plate 920.

The roadside processing device 130 is configured to transmit the registration number information and the image of the number plate 920 to the vehicle number identification device 200. In this connection, the roadside processing device 130 may transmit the entire image of the vehicle 900 instead of the image of the number plate 920 so that the vehicle number identification device 200 can extract the image of the number plate 920 from the entire image of the vehicle 900.

For example, the roadside processing device 130 is configured of a workstation or a computer such as a personal computer (PC).

The vehicle number identification device 200 makes an attempt to identify the vehicle 900 using the information acquired from the roadside processing device 130. For example, the vehicle number identification device 200 is configured of a workstation or a computer such as a personal computer.

Figure 3:
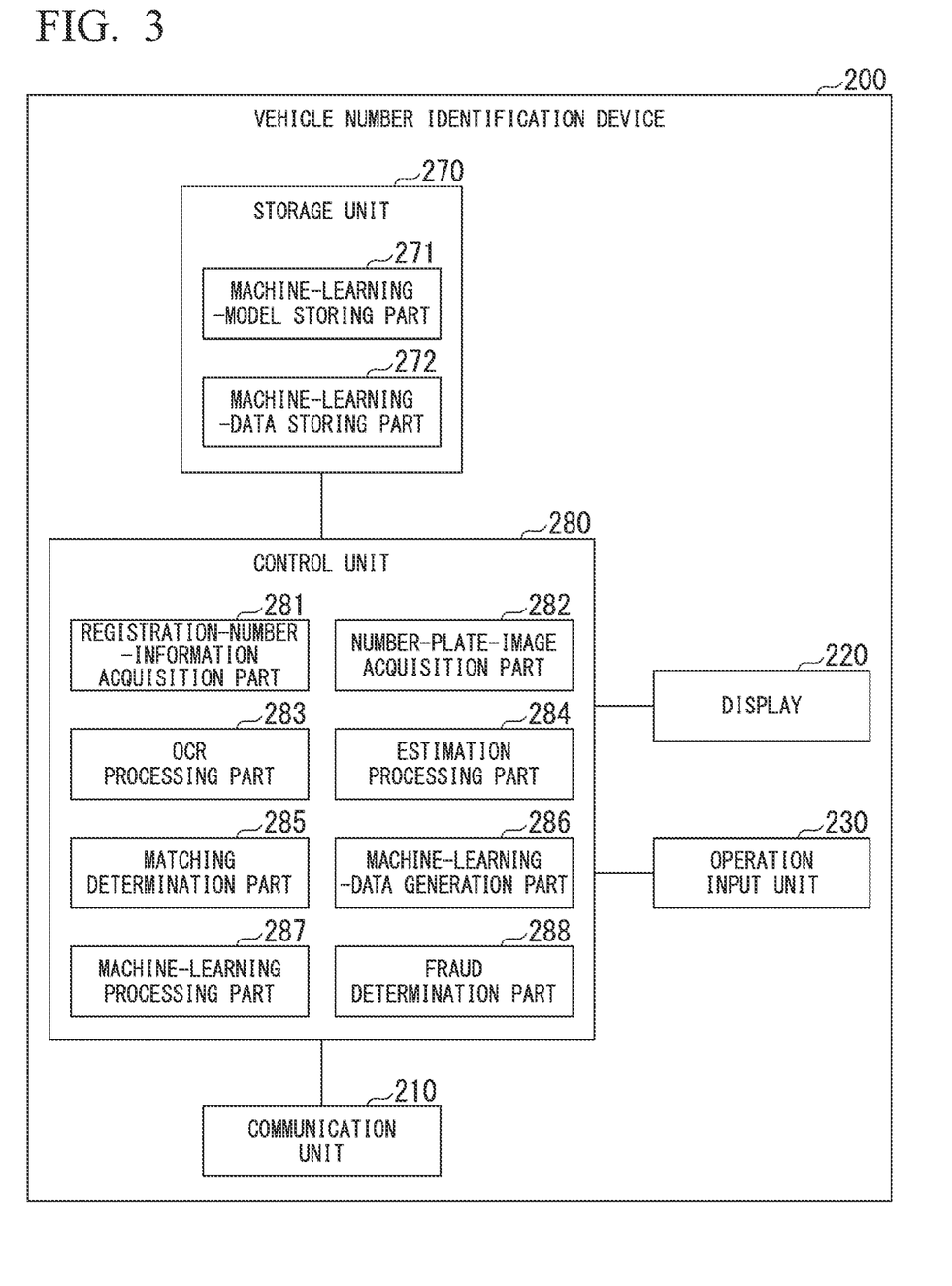
FIG. 3 is a block diagram showing an exemplary functional configuration of a vehicle number identification device according to the exemplary embodiment.

FIG. 3 is a block diagram showing an exemplary functional configuration of the vehicle number identification device 200. In the configuration shown in FIG. 3, the vehicle number identification device 200 includes a communication unit 210, a display 220, an operation input unit 230, a storage unit 270, and a control unit 280. The storage unit 270 includes a machine-learning-model storing part 271 and a machine-learning-data storing part 272. The control unit 280 includes a registration-number-information acquisition part 281, a number-plate-image acquisition part 282, an OCR processing part 283, an estimation processing part 284, a matching determination part 285, a machine-learning-data generation part 286, a machine-learning processing part 287, and a fraud determination part 288.

The communication unit 210 communicates with other devices. In particular, the communication unit 210 communicates with the roadside processing device 130 to receive the registration number information and the image of the number plate 920 from the roadside processing device 130.

For example, the display 220 is equipped with a display device configured to display various images such as a liquid-crystal panel and an LED (Light-Emitting Diode) panel. In particular, the display 220 represents an example of an image presentation unit which is configured to display the image of the number plate 920 under the control of the control unit 280. Owing to a display operation, the display 220 may present an operator with the image of the number plate 920. Herein, an operator is workman who reads the vehicle number from the image of the number plate 920 and inputs the image of the number plate 920 to the vehicle number identification device 200.

For example, the operation input unit 230 is equipped with an input device configured to receive a user operation, such as a keyboard and a mouse as well as a touch sensor which forms a touch panel attached to a display device of the display 220. In particular, the operation input unit 230 is configured to receive a user operation input by an operator to read the vehicle number from the image of the number plate 920.

The storage unit 270 is configured to store various types of information. The storage unit 270 is configured of a storage device installed in the vehicle number identification device 200.

The machine-learning-model storing part 271 is configured to store a machine-learning model. Herein, the machine-learning model is a model configured to output a vehicle number upon inputting the image of the number plate 920, which is produced as a result of machine learning executed by the machine-learning processing part 287. In this connection, it is possible to use various machine-learning algorithms as a machine-learning algorithm for generating or updating the machine-learning model stored on the machine-learning-model storing part 271. For example, the machine-learning model can be formed as any one of a support-vector machine, a neural network, a decision tree, and a random forest.

The machine-learning-data storing part 272 is configured to store the machine-learning data. Herein, the machine-learning data is configured of data for generating or updating the machine-learning model stored on the machine-learning-model storing part 271. The machine-learning-data storing part 272 is configured to store the machine-learning data as the information representing an association between the image of the number plate 920 and the vehicle number serving as answer data to the inputted image of the number plate 920.

The control unit 280 is configured to carry out various types of processes by controlling various parts of the vehicle number identification device 200. The control unit 280 is configured of a CPU (Central Processing Unit) installed in the vehicle number identification device 200, which may read and execute programs from the storage unit 270.

The registration-number-information acquisition part 281 is configured to acquire the registration number information. Specifically, the registration-number-information acquisition part 281 is configured to extract the registration number information from the received data which the communication unit 210 receives from the roadside processing device 130. As described above, the registration number information is associated with the media identification information recorded on the identification media 910 installed in the vehicle 900.

The number-plate-image acquisition part 282 is configured to acquire the number-plate image of the vehicle 900. Herein, the number-plate image corresponds to an image of the number plate 920. The number-plate-image acquisition part 282 is configured to acquire the number-plate image as image data. Specifically, the number-plate-image acquisition part 282 is configured to extract the image data of the number plate 920 from the received data which the communication unit 210 receives from the roadside processing device 130.

The OCR processing part 283 is configured to carry out an optical character recognition (OCR) of the number-plate image acquired by the number-plate-image acquisition part 282. In this connection, the information representing the result of the optical character recognition by the OCR processing part 283 will be referred to as the OCR resultant information.

The OCR resultant information may represent the vehicle number described on the number plate 920 when the OCR processing part 283 successfully carries out an optical character recognition on the condition that the image data of the number plate 920 acquired by the number-plate-image acquisition part 282 appropriately shows the image of the number plate 920.

On the other hand, the OCR resultant information may not necessarily be equivalent to the information representative of the number plate when the image data acquired by the number-plate-image acquisition part 282 does not actually represent the image of the number plate 920, for example, when the roadside processing device 130 fails to acquire the image of the number plate 920. In addition, the OCR resultant information may not necessarily be equivalent to the information representative of the vehicle number when the OCR processing part 283 fails to recognize characters due to some reasons although the image data acquired by the number-plate-image acquisition part 282 represents the image of the number plate 920.

The estimation processing part 284 is configured to input the number-plate image acquired by the number-plate-image acquisition part 282 into the machine-learning model stored on the machine-learning-model storing part 271. An output of a machine-learning model responsive to an input of the number-plate image will be referred to as the estimation result information.

The estimation result information may show the vehicle number when the machine-learning model indicates an association between the vehicle information and the image of the number plate 920 on the condition that the image data of the number plate 920 acquired by the number-plate-image acquisition part 282 appropriately shows the image of the number plate 920.

On the other hand, the estimation processing part 284 may set the estimation result information to a predetermined value representing a failure of estimating the vehicle number when the image data acquired by the number-plate-image acquisition part 282 does not actually represent the image of the number plate 920, for example, when the roadside processing device 130 fails to acquire the image of the number plate 920.

The matching determination part 285 is configured to identify the vehicle number as the vehicle number of the identified vehicle 900 when the matching determination part 285 determines that at least two types of information out of the registration number information, the OCR resultant information, and the estimation result information indicate the same vehicle number.

That is, the matching determination part 285 is configured to determine whether or not two vehicle numbers, i.e. the majority of three vehicle numbers acquired by the vehicle number identification system 1 according to three methods, or more indicate the same vehicle number. When the majority of three vehicle numbers indicates the same vehicle number, the matching determination part 285 proceeds to its subsequent process upon recognizing the correctness of the vehicle number.

When the matching determination part 285 determines that any combination including two types of information out of the registration number information, the OCR resultant information, and the estimation result information does not indicate the same vehicle number, as described above, the display 220 may present an operator with the number-plate image.

When the matching determination part 285 determines that at least two types of information out of the registration number information, the OCR resultant information, and the estimation result information indicates the same vehicle number, the machine-learning-data generation part 286 may generate the machine-learning data associated with the vehicle number and the number-plate image serving as a source for detecting the vehicle number.

Accordingly, it is possible for the machine-learning-data generation part 286 to automatically generate the machine-learning data representing an association between the number-plate image and the vehicle number which the matching determination part 285 determines its correctness.

In addition, the machine-learning-data generation part 286 is configured to generate the machine-learning data representing an association between the number-plate image displayed on the display 220 and the vehicle number which is input by an operator responsive to the displayed number plate.

It is expected that an operator may correctly input the vehicle number with reference to the number-plate image. In this connection, it is expected that the machine-learning-data generation part 286 may generate the correct learning data.

The machine-learning processing part 287 carries out machine learning using the machine-learning data stored on the machine-learning-data storing part 272. According to the machine learning, it is possible to generate or update a machine-learning model stored on the machine-learning-model storing part 271. Since the machine-learning processing part 287 proceeds with the machine learning, it is expected for the estimation processing part 284 to improve the accuracy of estimating the vehicle number using the machine-learning model.

When the matching determination part 285 determines an incapacity of obtaining the registration number information representing the same vehicle number as the vehicle number indicated by the OCR resultant information and the estimation result information, the fraud determination part 288 may determine a possibility of a fraudulent vehicle indicated by the vehicle number. For example, the fraud determination part 288 may control the display 220 to display a warning message.

As one example of an incapacity of obtaining the registration number information representing the same vehicle number as the vehicle number indicated by the OCR resultant information and the estimation result information, it is possible to mention an incapacity of obtaining the vehicle number as the registration number information.

As one example of an incapacity of obtaining the vehicle number as the registration number information, it is possible to mention an event in which the identification media 910 is fraudulently removed from the vehicle 900. In this event, the vehicle 900 can be regarded as a fraudulent vehicle.

Another example of an incapacity of obtaining the vehicle number as the registration number information, it is possible to mention a failure of conducting a communication between the antenna 110 and the identification media 910 due to some reasons even though the identification media 910 is properly attached to the vehicle 900. In this case, the vehicle 900 cannot be regarded as a fraudulent vehicle.

The matching determination part 285 cannot obtain the registration number information due to a fraudulent removal of the identification media 910 from the vehicle 900 and a failed communication between the identification media 910 and the antenna 110.

Due to an incapacity of obtaining the registration number information although the OCR resultant information and the estimation result information indicate the same vehicle number, the matching determination part 285 determines that the registration number information cannot be obtained although the OCR resultant information and the estimation result information indicate the same vehicle number through a comparison between the registration number information, the OCR resultant information, and the estimation result information.

As another example of an incapacity of obtaining the registration number information representing the same vehicle information indicated by the OCR resultant information and the estimation result information, it is possible to mention an event in which the registration number information represents the vehicle number differently than the vehicle number indicated by the OCR resultant information and the estimation result information.

As one example of the event in which the registration number information represents the vehicle number differently than the vehicle number indicated by the OCR resultant information and the estimation result information, it is possible to mention an event in which the identification media 910 is fraudulently replaced with another identification media 910 of another vehicle 900. In this event, the vehicle 900 will be regarded as a fraudulent vehicle.

As a further example of the event in which the registration number information represents the vehicle number differently than the vehicle number indicated by the OCR resultant information and the estimation result information, it is possible to mention an event in which the number plate 920 is fraudulently replaced with another number plate 920 of another vehicle 900. In this event, the vehicle 900 will be regarded as a fraudulent vehicle.

The matching determination part 285 is able to acquire the registration number information in either the event in which the identification media 910 is fraudulently replaced with another identification media 910 of another vehicle 900 and the event in which the number plate 920 is fraudulently replaced with another number plate 920 of another vehicle 900, however, the registration number information would be different from the vehicle number indicated by the OCR resultant information and the estimation result information.

When the OCT resultant information and the estimation result information indicate the same vehicle number differently than the registration number information, the matching determination part 285 an incapacity of obtaining the registration number information representing the same vehicle number as the vehicle number indicated by the OCR resultant information and the estimation result information through a comparison between the registration number information, the OCR resultant information, and the estimation result information.

Next, the operation of the vehicle number identification system 1 will be described with reference to FIGS. 4-6.

Figure 4:
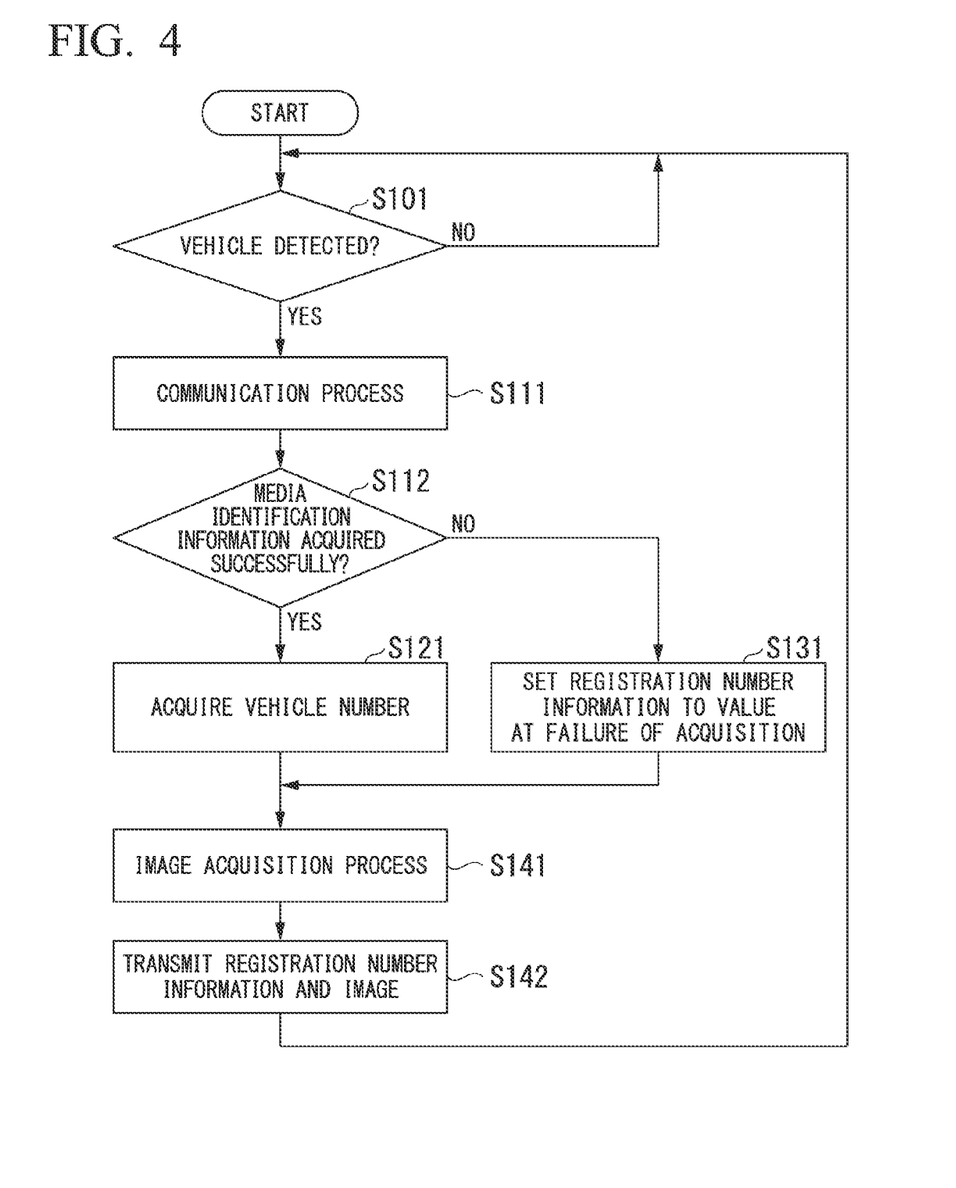
FIG. 4 is a flowchart showing an exemplary procedure of processing implemented by a roadside processing device according to the exemplary embodiment.

FIG. 4 is a flowchart showing an exemplary procedure of processes implemented by the roadside processing device 130.

In the flow of FIG. 4, the roadside processing device 130 determines whether or not to detect the vehicle 900 (step S101). For example, the roadside processing device 130 determines that the vehicle 900 is detected upon determining a reception of a signal from the identification media 910 via the antenna 110 or an operation of the camera 120 to capture an image of the vehicle 900.

The flow returns to step S101 when the roadside processing device 130 determines that the vehicle 900 is not detected in step S101 (step S101: NO). In this case, the roadside processing device 130 may wait for an appearance of the vehicle 900.

When the roadside processing device 130 determines that the vehicle 900 is detected in step S101 (step S101: YES), the roadside processing device 130 makes an attempt to communicate with the identification media 910 via the antenna 110 (step S111). In particular, the roadside processing device 130 makes an attempt to receive the media identification information from the identification media 910.

Subsequently, the roadside processing device 130 determines whether or not to successfully acquire the media identification information (step S112). Upon determining successful acquisition of the media identification information (step S112: YES), the roadside processing device 130 acquires the vehicle number associated with the media identification information (step S121). The roadside processing device 130 obtains the vehicle number as the registration number information.

In addition, the roadside processing device 130 makes an attempt to acquire an image of the number plate 920 from an image captured by the camera 120 (step S141). As described above, for example, the camera 120 is configured to capture an image of the entire front face of the vehicle 900. Subsequently, the roadside processing device 130 may extract an image of the number plate 920 from an image captured by the camera 120.

The roadside processing device 130 transmits the registration number information and an image of the number plate 920 to the vehicle number identification device 200 (step S142).

After step S142, the flow proceeds to step S101.

Upon determining a failure of acquiring the media identification information in step S112 (step S112: NO), the roadside processing device 130 sets the registration number information to a predetermined value indicating a failure of acquiring the vehicle number (step S131).

After step S131, the flow proceeds to step S141.

Figure 5:
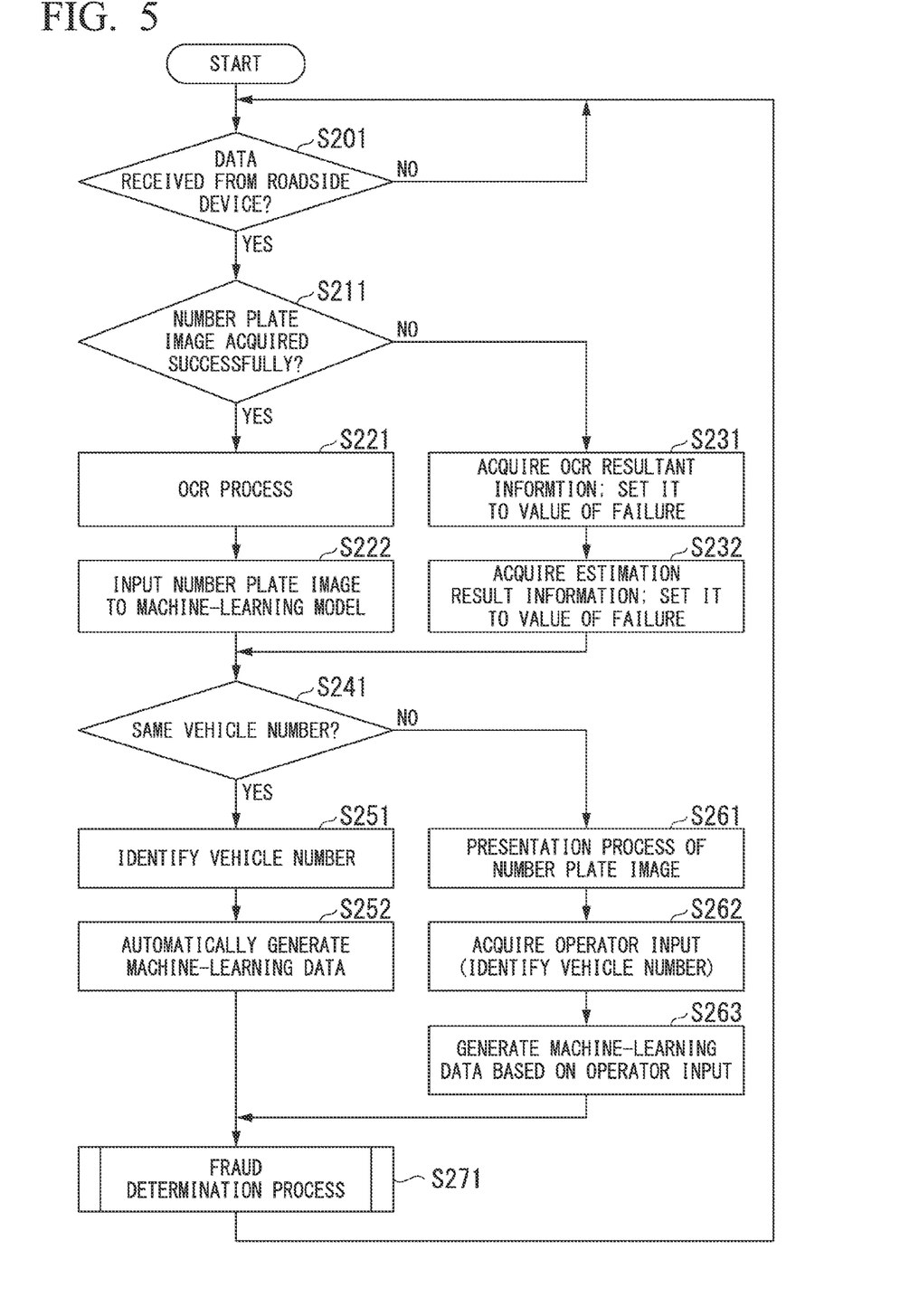
FIG. 5 is a flowchart showing an exemplary procedure of processing implemented by the vehicle number identification device according to the exemplary embodiment.

FIG. 5 is a flowchart showing an exemplary procedure of processing implemented by the vehicle number identification device 200.

In the flow of FIG. 5, the control unit 280 determines whether or not the communication unit 210 receives data from the roadside device 100 (step S201).

When the control unit 280 determines that the communication unit 210 does not receive any data from the roadside device 100 (step S201: NO), the flow returns to step S201. In this case, the vehicle number identification device 200 waits for a reception of data from the roadside device 100.

Upon determining a reception of data from the roadside device 100 (step S201: YES), the control unit 280 determines whether or not to successfully acquire the image of the number plate 920 according to the data received from the roadside device 100 (step S211).

When the control unit 280 determines successfully acquiring the image of the number plate 920 (step S211: YES), the OCR processing part 283 carries out an optical character recognition with respect to the image of the number plate 920 (step S221). In addition, the estimation processing part 284 inputs the image of the number plate 920 into the machine-learning model to produce the estimation result information (S222).

Next, the matching determination part 285 determines whether or not at least two types of information out of the registration number information, the OCR resultant information, and the estimation result information indicate the same vehicle number (step S241).

Upon determining that at least two types of information out of the registration number information, the OCR resultant information, and the estimation result information indicate the same vehicle number (step S241: YES), the matching determination part 285 identifies the vehicle number (step S251). Specifically, the matching determination part 285 identifies the vehicle number of the identified vehicle 900 as the vehicle number indicated by at least two types of information out of the registration number information, the OCR resultant information, and the estimation result information. Provided a host device such as a billing system, the vehicle number identification device 200 notifies the host device of the identified vehicle number.

In addition, the machine-learning-data generation part 286 generates the machine-learning data representing an association between the image of the number plate 920 acquired by the roadside processing device 130 and the vehicle number identified by the matching determination part 285 (step S252). In this case, the machine-learning-data generation part 286 may automatically generate the machine-learning data since it does not need any operation by an operator. The machine-learning-data generation part 286 generates and stores the machine-learning data on the machine-learning-data storing part 272.

Next, the fraud determination part 288 determines a possibility of committing a fraud of identification media (step S271).

After step S271, the flow returns to step S201.

When the control unit 280 determines a failure of acquiring the image of the number plate 920 in step S211 (step S211: NO), the OCR processing part 283 sets the OCR resultant information to a predetermined value indicating a failure of acquiring the image data of the number plate 920 (step S231).

In addition, the estimation processing part 284 sets the estimation result information to a predetermined value indicating a failure of acquiring the image data of the number plate 920 (step S232).

After step S232, the flow proceeds to step S241.

Upon determining that none of the registration number information, the OCR resultant information, and the estimation result information indicates the same vehicle number in step S241 (step S241: NO), the display 220 displays the image of the number plate 920 under the control of the control unit 280 (step S261).

Subsequently, the matching determination part 285 acquires an input of an operator (step S262). The operator conducts a user operation to input the vehicle number indicated by the image of the number plate 920 into the operation input unit 230. The matching determination part 285 acquires the vehicle number inputted thereto.

In addition, the machine-learning-data generation part 286 generates the machine-learning data representing an association between the image of the number plate 920 acquired by the roadside processing device 130 and the vehicle number obtained by an input of an operator (step S263). The machine-learning-data generation part 286 generates and stores the machine-learning data on the machine-learning-data storing part 272.

After step S263, the flow proceeds to step S271.

Figure 6:
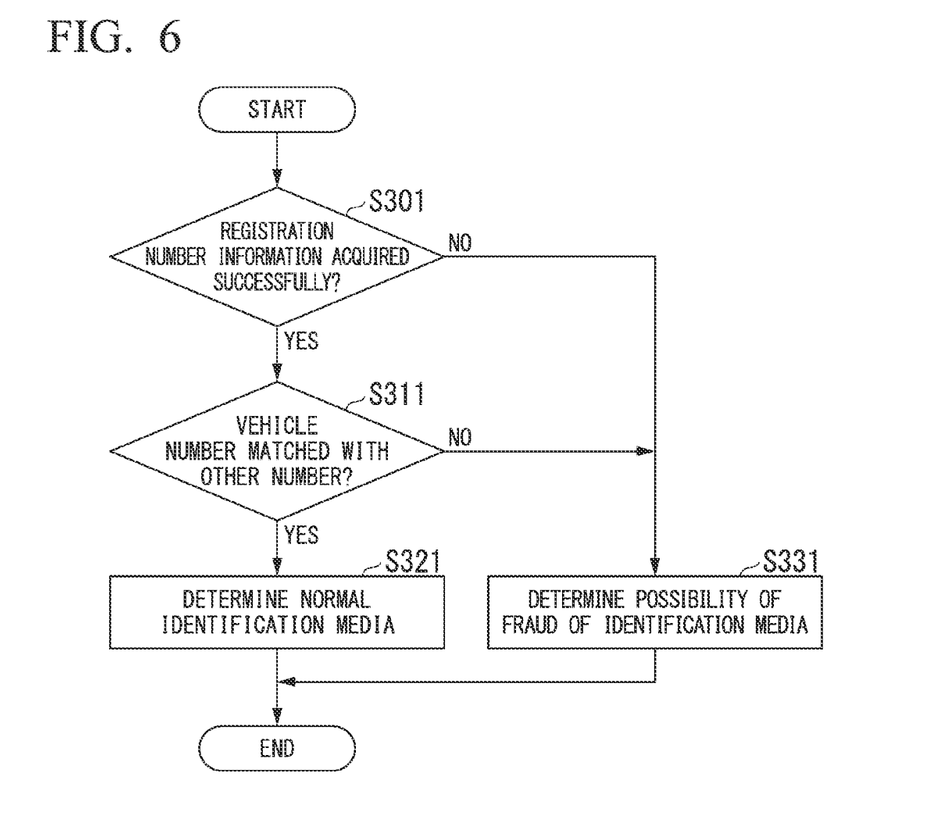
FIG. 6 is a flowchart showing an exemplary procedure of processing for determining a fraud of identification media with a fraud determination part according to the exemplary embodiment.

FIG. 6 is a flowchart showing an exemplary procedure of processing of the fraud determination part 288 configured to determine a possibility of committing a fraud of identification media. The fraud determination part 288 carries out the process of FIG. 6 in step S271 of FIG. 5.

In the flow of FIG. 6, the fraud determination part 288 determines whether or not to obtain the vehicle number as the registration number information from the roadside processing device 130 (step S301).

Upon determining that the vehicle number is obtained from the roadside processing device 130 (step S301: YES), the fraud determination part 288 determines whether or not the registration number information and at least one of the OCR resultant information and the estimation result information indicate the same vehicle number (step S311).

Upon determining that the registration number information and at least one of the OCR resultant information and the estimation result information indicate the same vehicle number (step S311: YES), the fraud determination part 288 determines that the identification media 910 is normal (step S321). That is, the fraud determination part 288 determines that no fraud is detected with respect to the identification media 910. In this case, the fraud determination part 288 determines that the vehicle 900 cannot be regarded as a fraudulent vehicle.

After step S321, the vehicle number identification device 200 exits the flow of FIG. 6.

Upon determining that the vehicle number is not obtained from the roadside processing device 130 in step S301 (step S301: NO), the fraud determination part 288 determines a possibility of committing a fraud of the identification media 910 (S331). In this case, the fraud determination part 288 determines the possibility of the vehicle 900 regarded as a fraudulent vehicle.

After step S331, the vehicle number identification device 200 exits the flow of FIG. 6.

Upon determining that neither the registration number information nor at least one of the OCR resultant information and the estimation result information indicates the same vehicle number in step S311 (step S311: NO), the flow proceeds to step S331.

As described above, the registration-number-information acquisition part 281 is configured to acquire the registration number information associated with the identification media 91 installed in the vehicle 900. The number-plate-image acquisition part 282 is configured to acquire the number-plate image of the vehicle 900. The OCR processing part 283 is configured to acquire the OCR resultant information representing the result of an optical character recognition of the number-plate image. The estimation processing part 284 is configured to input the number-plate image into the machine-learning model and to obtain the estimation result information output from the machine-learning model. Upon determining that at least two types of information out of the registration number information, the OCR result information, and the estimation result information indicate the same vehicle number, the matching determination part 285 identifies the vehicle number as the vehicle number of the identified vehicle 900.

It is possible for the vehicle number identification device 200 to use the machine-learning data representing an association between the number plate information used for identifying the vehicle 900 and the vehicle number resulting from identification of the vehicle 900. Therefore, it is possible for the vehicle number identification device 200 to improve the accuracy of identifying the vehicle 900 via the machine learning without the necessity of collecting special data for the purpose of generating machine-learning data. In this point, it is possible for the vehicle number identification device 200 to reduce a burden of human resources required for its device operation, thus achieving a relatively small burden of human resources.

The method for acquiring the registration number information with the registration-number-information acquisition part 281 is not necessarily limited to the aforementioned method for acquiring the registration number information associated with the media identification information.

In this connection, it is possible record the registration number information in the form which cannot be falsified by a user of the identification media 910, for example, in the form that the registration number information is encrypted and recorded on identification media. Subsequently, the registration-number-information acquisition part 281 may acquire the registration number information recorded on the identification media 910.

When the matching determination part 285 determines that at least two types of information out of the registration number information, the OCR resultant information, and the estimation result information indicates the same vehicle number, the machine-learning-data generation part 286 may generate the machine-learning data representing an association between the vehicle number and the number-plate image.

Accordingly, the machine-learning-data generation part 286 may automatically generate the machine-learning data.

When the matching determination part 285 determines that any combination including two types of information out of the registration number information, the OCR resultant information, and the estimation result information does not indicate the same vehicle number, the display 220 may present the number-plate image. The machine-learning-data generation part 286 may generate the machine-learning data representing an association between the vehicle number inputted thereto and the number-plate image.

Only when the matching determination part 285 determines that any combination including two types of information out of the registration number information, the OCR resultant information, and the estimation result information does not indicate the same vehicle number, an operator needs to input the vehicle number with the vehicle number identification device 200. Normally, it is expected that the registration number information and the OCR resultant information indicate the same vehicle number, and therefore it is possible to decrease the frequency that an operator needs to input the vehicle number.

In addition, an operator needs to read the vehicle number from the image of the number plate 920 displayed on the display 220 and to input the vehicle number with the vehicle number identification device 200, and therefore it is possible to generate machine-learning data with a relatively simple operation.

When the matching determination part 285 determines an incapacity of obtaining the registration number information representing the same vehicle number as the vehicle number indicated by the OCR resultant information and the estimation result information, the fraud determination part 288 determines a possibility that a vehicle having the vehicle number could be regarded as a fraudulent vehicle.

According to the vehicle number identification device 200, as described above, it is possible to identify the vehicle 900 and to determine the possibility of committing a fraud.

The foregoing processes can be achieved by recording programs realizing part of or entirety of the functionality of the control unit 280 on recording media, loading and executing programs recorded on recording media with a computer system. Herein, the term "computer system" include the OS and hardware such as peripheral devices.

The term "computer-readable recording media" include flexible disks, magneto-optical disks, ROM, portable media such as CD-ROM, and storage devices such as hard disks embedded in computer systems. The foregoing programs may achieve part of the foregoing functions, or the foregoing programs can realize the foregoing functions when combined with programs pre-installed in computer systems.

Heretofore, the exemplary embodiment of the present invention has been described in detail with reference to the drawings; however, the concrete configurations are not necessarily limited to the foregoing embodiment, and therefore the present invention may embrace any design changes without departing from the essence of the invention.

INDUSTRIAL APPLICABILITY

The exemplary embodiment of the present invention relates to a vehicle number identification device including a registration-number-information acquisition part configured to acquire the registration number information associated with the media identification information recorded on identification media installed in a vehicle, a number-plate-image acquisition part configured to acquire a number-plate image of the vehicle, an OCR processing part configured to acquire the OCR resultant information representing the result of an optical character recognition with respect to the number-plate image, an estimation processing part configured to input the number-plate image into a machine-learning model and to acquire the estimation result information output from the machine-learning model, and a matching determination part configured to identify the vehicle number of the vehicle upon determining that any combination of two types of information out of the registration number information, the OCR resultant information, and the estimation result information indicate the same vehicle number.

According to the exemplary embodiment, it is possible for a vehicle identification device to reduce a burden of human resources required for its device operation by sharing a method for acquiring the identification information from an in-vehicle device or a tag installed in a vehicle and another method, thus achieving a relatively small burden of human resources.

REFERENCE SIGNS LIST 1 vehicle number identification system
100 roadside device
110 antenna
120 camera
130 roadside processing device
200 vehicle number identification device
210 communication unit
220 display
230 operation input unit
270 storage unit
271 machine-learning-model storing part
272 machine-learning-data storing part
280 control unit
281 registration-number-information acquisition part
282 number-plate-image acquisition part
283 OCR processing part 284 estimation processing part
285 matching determination part
286 machine-learning-data generation part
287 machine-learning processing part
288 fraud determination part
900 vehicle
910 identification media
920 number plate

The invention claimed is:

1. A vehicle number identification device comprising:
a registration-number-information acquisition part configured to acquire registration number information associated with an identification media installed in a vehicle;
a number-plate-image acquisition part configured to acquire a number-plate image of the vehicle;
an OCR processing part configured to acquire OCR resultant information representing a result of an optical character recognition with respect to the number-plate image;
an estimation processing part configured to input the number-plate image into a machine-learning model and to acquire estimation result information output from the machine-learning model;
a matching determination part configured to determine whether at least two types of information out of the registration number information, the OCR resultant information, and the estimation result information indicate a same vehicle number and to identify the same vehicle number as a vehicle number of the vehicle;
a machine-learning-data generation part configured to generate machine-learning data representing an association between the vehicle number and the number-plate image when the matching determination part determines that at least two types of information out of the registration number information, the OCR resultant information, and the estimation result information indicate the same vehicle number; and
an image presentation part configured to present the number-plate image when the matching determination part determines that any combination including at least two types of information out of the registration number information, the OCR resultant information, and the estimation result information does not indicate the same vehicle number,
wherein the machine-learning-data generation part is configured to generate the machine-learning data representing an association between the vehicle number input thereto and the number-plate image.

2. The vehicle number identification device according to claim 1, further comprising a fraud determination part configured to determine a possibility of a fraudulent vehicle to be regarded as the vehicle indicated by the vehicle number when the matching determination part determines an incapacity of obtaining the registration number information representing the same vehicle number indicated by the OCR resultant information and the estimation result information.

3. A vehicle number identification method comprising the steps of:
acquiring registration number information associated with an identification media installed in a vehicle;
acquiring a number-plate image of the vehicle;
acquiring OCR resultant information representing a result of an optical character recognition with respect to the number-plate image;
inputting the number-plate image into a machine-learning model and thereby acquiring estimation result information output from the machine-learning model;
upon determining whether at least two types of information out of the registration number information, the OCR resultant information, and the estimation result information indicate a same vehicle number, identifying the same vehicle number as a vehicle number of the vehicle;
generating machine-learning data representing an association between the vehicle number and the number-plate image when it is determined that at least two types of information out of the registration number information, the OCR resultant information, and the estimation result information indicate the same vehicle number;
presenting the number-plate image when it is determined that any combination including at least two types of information out of the registration number information, the OCR resultant information, and the estimation result information does not indicate the same vehicle number; and
generating the machine-learning data representing an association between the vehicle number input thereto and the number-plate image.

4. A non-transitory computer-readable storage medium having a stored program causing a computer to implement the steps of:
acquiring registration number information associated with an identification media installed in a vehicle;
acquiring a number-plate image of the vehicle;
acquiring OCR resultant information representing a result of an optical character recognition with respect to the number-plate image;
inputting the number-plate image into a machine-learning model and thereby acquiring estimation result information output from the machine-learning model;
upon determining whether at least two types of information out of the registration number information, the OCR resultant information, and the estimation result information indicate a same vehicle number, identifying the same vehicle number as a vehicle number of the vehicle;
generating machine-learning data representing an association between the vehicle number and the number-plate image when it is determined that at least two types of information out of the registration number information, the OCR resultant information, and the estimation result information indicate the same vehicle number;
presenting the number-plate image when it is determined that any combination including at least two types of information out of the registration number information, the OCR resultant information, and the estimation result information does not indicate the same vehicle number; and
generating the machine-learning data representing an association between the vehicle number input thereto and the number-plate image.

* * * * *